United States Patent [19]
Grieve et al.

[11] Patent Number: 5,175,552
[45] Date of Patent: Dec. 29, 1992

[54] OPTIMUM MATCHED ILLUMINATION-RECEPTION RADAR

[75] Inventors: Philip G. Grieve, New York; Joseph R. Guerci, Astoria, both of N.Y.

[73] Assignee: Grumman Aerospace Corporation, Bethpage, N.Y.

[21] Appl. No.: 717,058

[22] Filed: Jun. 18, 1991

[51] Int. Cl.$^5$ .............................................. G01S 13/00
[52] U.S. Cl. ..................................... 342/82; 342/189
[58] Field of Search ................. 342/82, 108, 145, 189

[56] References Cited

PUBLICATIONS

Farnett et al., "Pulse Compression Radar," *Radar Handbook*. Chapter 10, pp. 10.1-10.8, ed. Merrill I. Skolnik, McGraw-Hill Publishing Co., 1990.

Skolnik, "Introduction to Radar Systems" pp. 369-373, McGraw Hill, 1980.

*Primary Examiner*—Mark Heller
*Attorney, Agent, or Firm*—Bacon & Thomas

[57] ABSTRACT

The signal-to-noise ratio of a received radar echo is maximized by maximizing the received energy E of the echo. The energy E is maximized when the transmitted waveform s(t) is chosen so that $$E = \int_{T_i}^{T_f} |y(t)|^2 \, dt$$

is maximized, where y(t) is the echo signal echoing from the target.

2 Claims, 1 Drawing Sheet

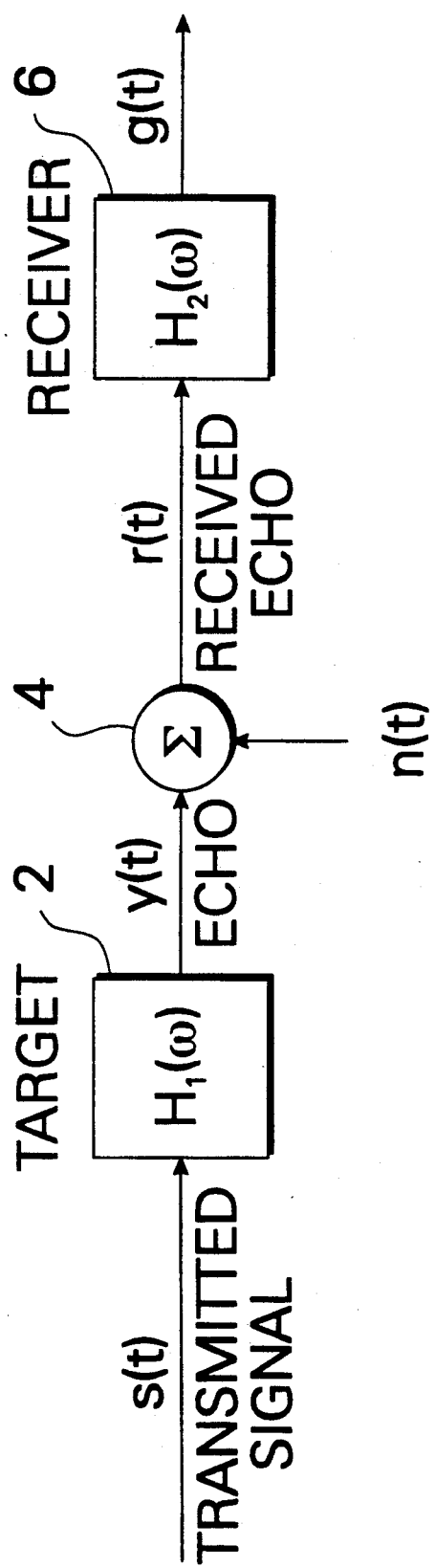

OPTIMUM MATCHED ILLUMINATION-RECEPTION RADAR

BACKGROUND OF THE INVENTION

1. Field of the Invention:

The present invention relates generally to radar detection of a target, and more specifically, to ground-to-air or air-to-air radar detection of targets using a target specific illuminating waveform and matched filter to optimize the radar receiver's output signal-to-noise ratio (SNR).

2. Description of the Related Art:

The state of the art of detecting low observable aircraft or other targets using radar has not advanced as quickly as the crafts themselves and their ability to evade detection. Detection to data has been limited in the type and character of modulation that would be applied to a transmitted signal. For example, the transmitters were incapable of applying arbitrary amplitude and phase modulation. With the advent of linear amplifiers, however, arbitrary amplitude and phase modulation is possible.

SUMMARY OF THE INVENTION

The present invention takes advantage of the advances in radar transmission technology by utilizing specific phase and amplitude modulations on the transmitted pulse to maximize receiver output SNR. To accomplish this, a transfer function $H_1(\omega)$ is first determined from characteristics that are completely described by the impulse response of the target—that is, the echo response of the target to an "infinitely" narrow radar pulse (Dirac delta function). The echo $y(t)$ is thus obtained by applying the transfer function $H_1(\omega)$ to the applied transmitted pulse $s(t)$ in accordance with well known principles of linear systems theory.

After adding noise $n(t)$, which is inherent to radar systems operation, the received echo $r(t)$ is then linearly processed by a receiver transfer function $H_2(\omega)$ to produce the output signal $g(t)$. As is well known to those knowledgeable in the art, the highest SNR is realized for the so-called "white" noise case when $H_2(\omega)$ is a matched filter, i.e., when $H_2(\omega) \theta\, Y^*(\omega)$, where $Y^*(\omega)$ is the complex conjugate of the Fourier transform of the noise-free echo $y(t)$. Under this condition, the receiver output $SNR = 2E/N_0$ where E is the energy in the echo $y(t)$ over the period of receiver observation, and $N_0/2$ is the noise power spectral density. Thus, the overall SNR is maximized when the energy E in the echo is maximized.

The energy E is maximized when $s(t)$ is chosen so that $$E = \int_{T_i}^{T_f} |y(t)|^2\, dt,$$

is maximized, where the observation time interval $T_i \to T_f$ is arbitrary, subject to the finite pulse duration constraint $$s(t) = 0 \text{ for } t \epsilon (0 < t < T)$$

and the finite energy constraint $$E_{in} = \int_0^T |s(t)|^2\, dt < \infty$$

Solving by the method of variational calculus yields the following homogeneous Fredholm integral equation which the optimum $s(t)$ must obey $$s(t) = \mu \int_0^T s(\tau)\, \gamma(t,\tau)\, d\tau,$$

where $$\gamma(t,\tau) = \int_{T_i}^{T_f} h_1(\lambda - t)\, h_1^*(\lambda - \tau)\, d\lambda,$$

where $h_1(t)$ is the impulse response of the target (the inverse Fourier transform of $H_1(\omega)$) and $\mu$ is the eigenvalue of the Fredholm integral equation.

BRIEF DESCRIPTION OF THE DRAWING

The lone FIGURE schematically illustrates the basic radar operation which is being optimized by this invention.

DETAILED DESCRIPTION OF THE PREFERRED EMBODIMENTS

As shown in the FIGURE, the basic operation of any radar system begins with the transmission of a radar signal $s(t)$ towards a target. Although the invention is ideally designed for detection of airborne targets, either from the air or from a ground-based transmitter/receiver system, those skilled in the art will readily recognize that the basic operation shown in the FIGURE is applicable to many other types of detection systems as well.

Returning to the FIGURE, upon interaction with the target 2, $s(t)$ is modulated according to the transfer function $H_1(\omega)$, which is a function of the impulse response of the target, and is specific to the target. The impulse response is defined as the echo from the target of an infinitely narrow pulse (Dirac delta function). The impulse response is a function of the shape and materials that comprise the target, as well as its aspect angle (angle of approach or descent along with attitude). Information concerning the impulse response is normally available through anechoic chamber testing, computer aided analysis, and/or intelligence.

The echo signal $y(t)$ from the target is then subjected to additive noise $n(t)$ that is inherent to any radar or similar system. As shown in the FIGURE at 4, this factor may be represented by the random (noisy) time-based function $n(t)$ summed with $y(t)$.

The echo signal thus received by the system is designated $r(t)$. At the receiver 6, another system (the receiver) transfer function $H_2(\omega)$ operates on the signal, resulting in the finally-received signal $g(t)$. To maximize the probability of detection of a target (for the Gaussian white noise case), the signal-to-noise ratio (SNR) associated with the signal $g(t)$ must be maximized.

As is known to those skilled in the art, a matched filter is the best receiver to accomplish this goal by maximizing the output ratio of peak signal power to mean noise power. In the white noise case, the matched filter is given by the transfer function $H_2(\omega) = kY^*(\omega)$ where k is an arbitrary constant. Thus, the frequency response of the receiver system is proportional to the complex conjugate of the echo spectrum, i.e., it has an impulse response proportional to the complex conjugated time inverse of the echo waveform. The resultant output SNR is given by $2E/N_0$, where $N_0/2$ is the noise power spectral density and E is the energy in the echo $y(t)$, which must be maximized to maximize the output SNR for the system.

To maximize E, $s(t)$ is chosen so that $$E = \int_{T_i}^{T_f} |y(t)|^2 dt,$$

is maximized, where the observation time interval $T_i \rightarrow T_f$ is arbitrary, subject to the finite pulse duration constraint $$s(t) = 0 \text{ for } t \epsilon (0 < t < T)$$

and the finite energy constraint $$E_{in} = \int_0^T |s(t)|^2 dt < \infty.$$

The constraints show that the duration of the pulse and observation intervals are arbitrary.

Solving by the method of variational calculus yields the following homogeneous Fredhold integral equation which the optimum $s(t)$ must obey $$s(t) = \mu \int_0^T s(\tau) \gamma(t,\tau) d\tau.$$

where $$\gamma(t,\tau) = \int_{T_i}^{T_f} h_1(\lambda - t) h_1^*(\lambda - \tau) d\lambda.$$

where $h_1(t)$ is the impulse response of the target (the inverse Fourier transform of $H_1(\omega)$) and $\mu$ is the eigenvalue of the Fredhold integral equation.

The foregoing technique does not interfere with other techniques for canceling clutter, and so can supplement known clutter cancellation techniques such as DPCA (displaced phase center array), or space-timing processing, for example.

Various modifications of the inventive system will become apparent to those skilled in the art. All such modifications that basically relate to the teachings through which the invention has advanced the state of the art are properly considered within the spirit and scope of the invention.

We claim:

1. A system for detecting a target by transmitting a radar signal $s(t)$ towards the target and receiving a radar echo signal $r(t)$ from the target, comprising:

transmitter means for transmitting an illumination waveform $s(t)$ towards said target responsive to a transmit signal;

receiver means for receiving an echo signal $r(t)$ from said target; and means for maximizing a signal-to-noise ratio of an output of said receiver means by phase and amplitude modulating the illumination waveform $s(t)$ according to the equation $$s(t) = \mu \int_0^T s(\tau) \gamma(t,\tau) d\tau.$$

where $\mu$ is the eigenvalue of the integral equation, $\tau$ is a dummy variable of integration representing the time over which $s(t)$ interacts with the target, T is the arbitrary duration of the transmitted pulse, $y(t,\tau)$ is the kernel of the equation given by the equation $$\gamma(t,\tau) = \int_{T_i}^{T_f} h_1(\lambda - t) h_1^*(\lambda - \tau) d\lambda.$$

where $h_1(t)$ is the impulse response of the target, and $T_i \rightarrow T_f$ is the observation duration which is arbitrary.

2. A system for detecting a target as claimed in claim 1, wherein $$s(t) = 0 \text{ for } t \quad (0 < t < T), \text{ and}$$

$$E_{in} = \int_0^T |s(t)|^2 dt < \infty.$$

* * * * *